United States Patent [19]

Ciancibello et al.

[11] Patent Number: 4,637,016
[45] Date of Patent: Jan. 13, 1987

[54] FRAME SYNCHRONIZATION CIRCUIT FOR DIGITAL TRANSMISSION SYSTEM

[75] Inventors: Carmine A. Ciancibello, Nepean; Dennis W. Mitchler, Ottawa, both of Canada

[73] Assignee: Northern Telecom Limited, Montreal, Canada

[21] Appl. No.: 732,115

[22] Filed: May 9, 1985

[51] Int. Cl.[4] .............................................. H04J 3/06
[52] U.S. Cl. ...................................... 370/100; 370/29
[58] Field of Search ......................... 370/29, 100, 109

[56] References Cited

U.S. PATENT DOCUMENTS

| | | | |
|---|---|---|---|
| 4,239,934 | 12/1980 | Andren | 370/109 |
| 4,467,473 | 8/1984 | Arnon et al. | 370/100 |
| 4,476,558 | 10/1984 | Arnon | 370/100 |

Primary Examiner—Douglas W. Olms
Assistant Examiner—Kenneth I. Rokoff

[57] ABSTRACT

A time compression multiplex digital transmission system having an improved frame synchronization circuit in which a limited window is gated open at a master station to search for the final synchronization bit of the incoming burst signal from a slave station. Thereafter the window is expanded to open just prior to the anticipated arrival of the initial synchronization bit of the following burst. Once the presence of this initial synchronization bit is confirmed frame synchronization of the incoming burst signal is established and the window is then gated substantially coextensively with that incoming signal.

3 Claims, 2 Drawing Figures

FRAME SYNCHRONIZATION CIRCUIT FOR DIGITAL TRANSMISSION SYSTEM

This invention relates to a digital transmission system and more particularly a frame synchronization circuit for use in a half-duplex system utilizing time compression multiplexing on telephone loops having discontinuities such as cable gauge changes and bridged taps.

BACKGROUND OF THE INVENTION

Existing subscriber loops can readily provide two-way digital transmission (full-duplex) on a pair of wires using analog signals at voice-band frequencies. This is achieved by amplitude-shift keying, phase-shift keying, frequency-shift keying, or other such techniques. However, full-duplex transmission of high-speed digital signals at ultrasonic bit rates is difficult to achieve on a single communication path. It has been proposed therefore to employ a time compression multiplex (TCM) technique on a half-duplex transmission system wherein a burst-mode or ping-pong approach is utilized.

Typically in such TCM systems, the digital information signal to be transmitted is divided into discrete portions and each portion compressed with respect to time to form a so-called "burst", occupying less than one-half the time of the original portion. The transmitter at each terminal alternately transmits the burst onto the path, following which the associated receiver at each terminal can receive a corresponding burst from the other transmitter. On receipt, each burst is expanded to occupy its original time span. Externally, the system appears to be transmitting the two digital information streams continuously and simultaneously, i.e. full-duplex communication. So far as the transmission path is concerned, however, half-duplex transmission takes place with alternate bursts travelling in opposite directions.

Having transmitted its own burst, each transmitter must wait until the incoming burst from the other transmitter has been cleared from the communcation path before it can transmit again. Arrival of the incoming burst will be delayed by at least a time interval equal to twice the transmission delay or propagation time of the path. The time interval (dead time) detracts from the efficiency of utilization of the communication path. Thus, for a given burst length, the efficiency decreases as the path length increases. The efficiency can be improved, for a given path length, by increasing the length of each burst, thus increasing the "on" time relative to the "dead" time. However, this exacerbates the synchronizing timing problem by increasing the corresponding reception interval during which the receiver is turned off and hence the receiver's clock receives no control bits to keep it synchronized. As a result, these systems function well on short loops, particularly with short bursts, in which strong signals are received. However, on long loops spurious signals resulting from cable irregularities such as gauge changes and bridge taps (which cause reflected pulses), can cause false synchronization to be established.

In a paper by R. Montemurro et al entitled "Realisation d'un equipment terminal numerique d'abonne pour service telephonique et de donnees", colloque international de commutation; International Switching Symposium, Paris, 11 May 1979, pp. 926-933; there is described a synchronization technique in which two frame bits are added, one at the beginning and the other at the end of each burst. This arrangement helps to prevent false synchronization since it can only occur if one or the other of the bits which was erroneously detected as a true synchronization bit, is outside the burst. Thus, essentially the only condition that can cause false synchronization to be detected is one in which the two detected bits, one a spurious bit and the other a signal bit, have the correct polarity and are spaced from one another by the correct interval. However, such a system utilizes a guard time to insure that adequate delay of all reflected signals takes place before signal transmission commences in the opposite direction.

This problem has been alleviated by providing a window which is coextensive with the received burst once synchronization is established. Such a technique has been described in applicant's U.S. Pat. No. 4,476,558 issued Oct. 9, 1984 to Ephraim Arnon. Thus, once frame synchronization has been established, the signals are only gated to the receiver during a window interval which is coextensive with that of the received bursts. With this arrangement a signal burst can be transmitted immediately after one is received at a slave station, with no guard time between the two bursts. However, a problem arises at a master or control station due to the relatively large capacitance of the line. It was found that this capacitance can cause post transmission transients resulting in a trailing edge on each of the transmitted bursts. This trailing edge may be detected as an initial synchronization bit which in conjunction with some of the received signal bits could cause the circuit to repeatedly jump into and out of a false synchronization mode, thereby preventing true synchronization from being established.

This problem has been further alleviated by utilizing the final synchronization bit of one burst and the initial synchronization bit of the following burst to establish frame synchronization as described in applicant's U.S. Pat. No. 4,467,473 issued Aug. 21, 1984 to Ephraim Arnon et al. This technique is possible since the bursts are transmitted at regular intervals under control of the master station. As described in this Patent there is a check for the presence of an initial synchronization bit a preselected number of bit periods following the final synchronization bit of the previous frame, rather than the presence of initial and final synchronization bits in the same frame.

STATEMENT OF THE INVENTION

The present invention provides an improved circuit for establishing such frame synchronization at the master station. Initially a limited window is utilized to determine the location of the final synchronization bit of an incoming burst. Thereafter the window is expanded to open just prior to the anticipated arrival of the initial synchronization bit of the following burst. A check is then made to determine the presence of the initial synchronization bit a predetermined interval after the final synchronization bit. If this occurs, synchronization is established and the window is then gated substantially coextensively with that of the incoming burst. To sustain synchronization, a check is made to confirm the presence of both the final and initial synchronization bits of consecutive bursts.

Thus, in accordance with the present invention there is provided a digital transmission system having a master station and slave station each including transmitting and receiving circuitry for alternately transmitting and receiving bursts of digital signals of fixed length at fixed frame intervals over a single transmission path. Each burst of the digital signal includes initial and final synchronization bits at the beginning and ending respectively of each burst. Each station also includes circuitry for establishing frame synchronization. The receiver at the master station also includes a window gating circuit which is responsive to the absence of frame synchronization for passing bits of the received signal immediately preceding the transmission of each burst, to the circuitry for establishing frame synchronization. Such bits of the received signal include the final synchronization bit but exclude at least the initial synchronization bit of that received signal. This gating circuit is also responsive to the presence of frame synchronization for passing only signals received during a window period which is substantially coextensive with that of said bursts to the circuitry for establishing frame synchronization.

In a particular embodiment, the receiver at the master station also includes circuitry which is responsive to the final synchronization bit of one burst for opening the window substantially concurrently with the anticipated arrival of the initial synchronization bit of the succeeding burst.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
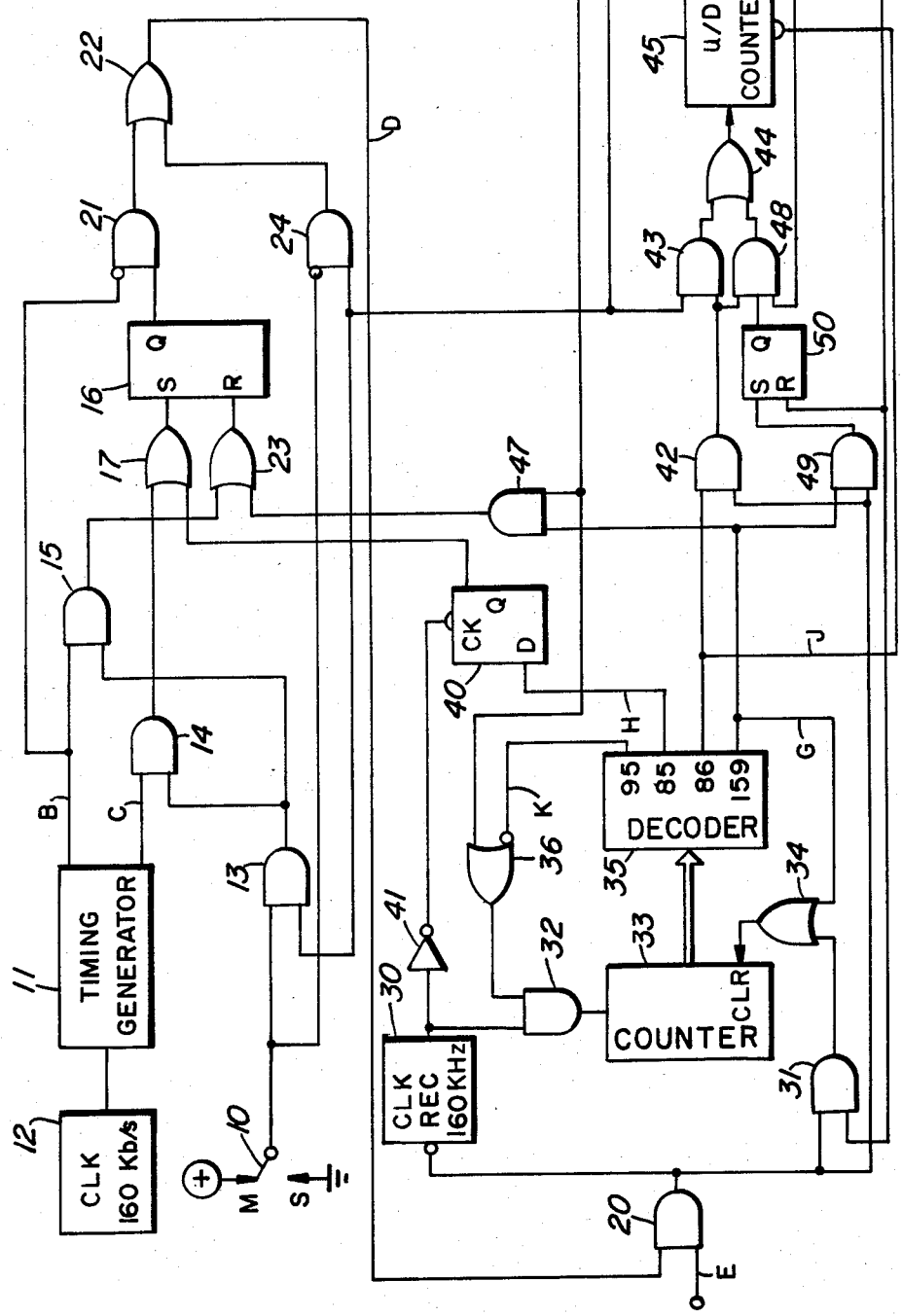
FIG. 1 is a block and schematic diagram of a synchronization circuit which will function at either a master or slave station in a digital transmission system, in accordance with the present invention.
Figure 2:
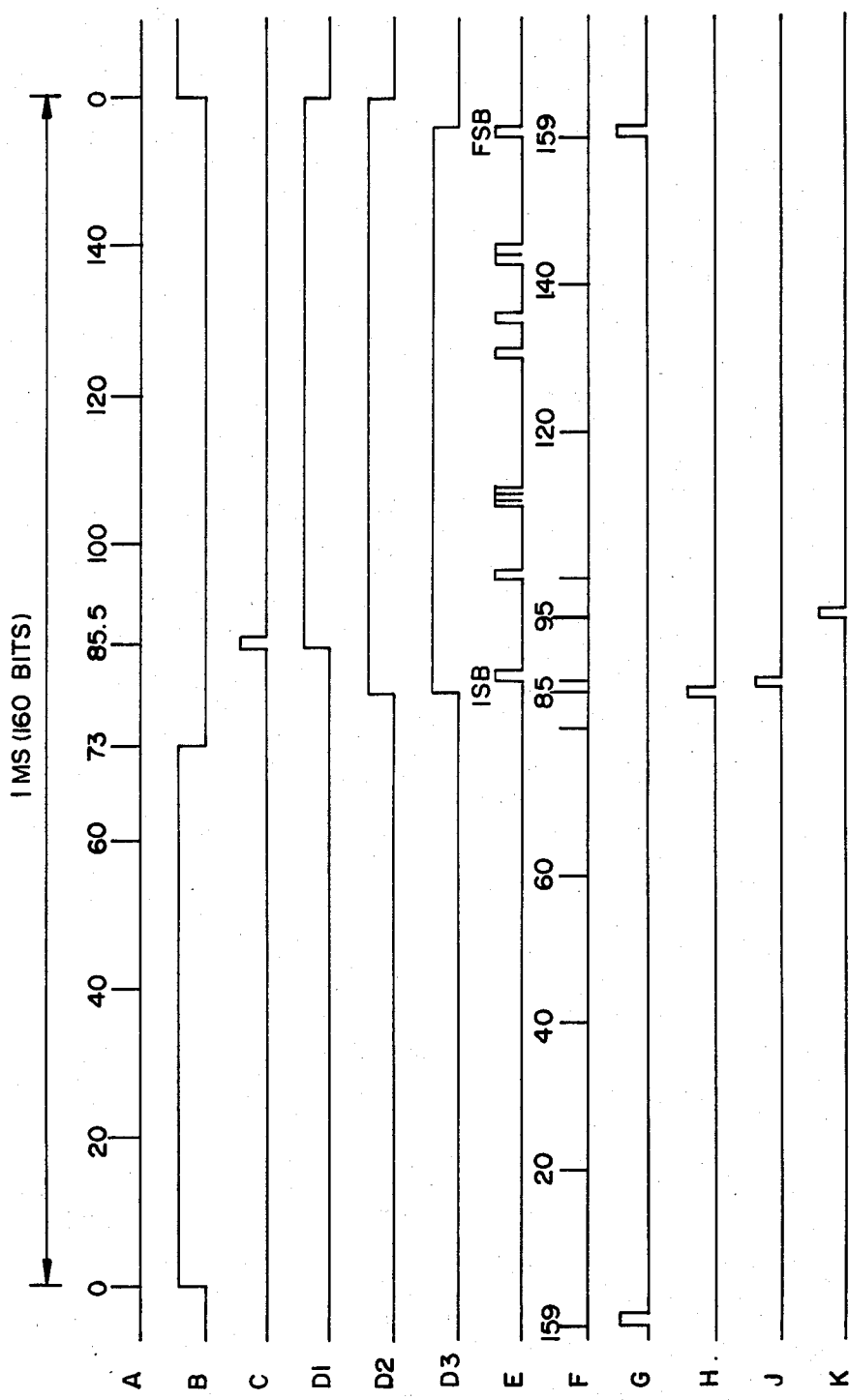
FIG. 2 is a series of waveform diagrams of digital or control signals which are received by or generated by the synchronization circuit illustrated in FIG. 1.

Referring to FIGS. 1 and 2, there is illustrated a synchronization circuit for use at either a master or a slave station of a digital transmission system. While the differences in operation at the two stations will be described, it is the operation in the master mode to which the present invention is particularly directed. The location in FIG. 1 of each of the waveforms illustrated in FIG. 2 is identified by corresponding reference characters. The circuit in this example embodiment transmits at a bit rate of 160 Kb/s. Each received or transmitted burst has a total of 72 information bits preceded and followed by a single initial and final synchronization bit for a total of 74 bits per burst.

There are two bit count waveforms A and F illustrated in FIG. 2, both of which have a count range from 0 to 159. Waveform A identifies the timing of the transmitted signal from the master station with bit count "0" being concurrent with the transmission of the initial synchronization bit. Waveform F identifies the timing of the received signal at the master station with bit count "0" immediately following the reception of the final synchronization bit. The transmit signal is synchronized to an internal clock while the receive signal is synchronized to a clock recovered from the incoming data signal. While the bit rate of the two signals is substantially synchronous since the transmit clock in the slave station is locked to the incoming data signal from the master station, their phase relationship is dependent upon the overall delay of the transmission path between the master and slave stations.

Referring again to FIG. 1, the synchronization circuit is set to function in either a master mode "M" or a slave mode "S" by the operation of a switch 10. In the master mode, the circuit utilizes both a transmit enable signal B and an out-of-sync trigger signal C generated by a timing generator 11 under control of an internal 160 Kb/s clock generator 12. The transmit/enable signal B which controls the timing of the transmitted burst, runs from bit count "0" to "73". In the master mode "M", the switch 10 is connected to an enabling voltage which enables an AND gate 13 whenever the circuit is in an out-of-sync condition. This condition enables AND gate 14 allowing flip-flop 16 to be repeatedly set by the trigger signal C through one input of an OR gate 17 when the circuit is in the out-of-sync condition. The Q output of the flip-flop 16 is coupled through an AND gate 21 and an OR gate 22 to generate a receive-enable signal D. The transmit enable signal B is coupled to an inverted input of the AND gate 21 to block the receive enable signal D during the transmit portion of the cycle.

FIG. 2 illustrates three distinct window modes for the receive-enable signal D. The first D1 occurs during an initial out-of-sync condition. It is triggered by the out-of-sync trigger signal C which sets the flip-flop 16 at bit count 85.5 so as to ensure that all spurious or reflected signals on the transmission line resulting from the transmitted burst, have dissipated. This delay is also sufficient to produce a 74.5 bit wide receive-enable signal D1 at the extreme end of the received data range. The delay can be longer so that the window D1 opens later as long as it opens early enough to capture the final synchronization bit FSB. However by opening at count 85.5 additional bits are allowed into the receiver to improve synchronization of the recovered clock signal. At the beginning of the next cycle, the flip-flop 16 is reset by the reading edge of the transmit/enable signal B so as to close the window D1. Once the location of the final synchronization bit FSB of the received data signal E has been established, the leading edge of the window is advanced as illustrated by the receive-enable signal D2. Once the integrity of the initial synchronization bit has been confirmed several times, the window is shortened to provide an in-sync receive-enable signal D3 which is substantially coextensive with the received data signal E. The generation of these three different windows will be manifest from the following description.

During an out-of-sync condition, the window D1 remains open until the flip-flop 16 is reset by the transmit/enable signal B. This signal B is coupled from AND gate 15 through one input of OR gate 23 to the reset input of the flip-flop 16. Whenever AND gate 20 is enabled by the receive-enable signal D as shown by either waveforms D1, D2, or D3, incoming data signal E is coupled to both the 160 KHz clock recovery circuit 30 and to one input of AND gate 31. The clock recovery circuit 30 includes a clock which generates an output signal of 160 Kb/s. It however is phase-locked to the incoming data signal E whenever it is present. This 160 Kb/s clock is coupled through one input of an AND gate 32 to drive a counter 33. During an out-of-sync condition, the counter 33 is continuously reset by the incoming data signal E, which is coupled through AND gate 31 and an OR gate 34 to the reset input of the counter 33. The output bus from the counter 33 is coupled to a decoder 35 which generates control signals G, H, J, and K at bit counts 159, 85, 86 and 95 of waveform F.

When the circuit is in an out-of-sync condition AND gate 32 is continuously enabled by control signal K, except during bit count 95. This one bit signal disables the AND gate 32 thereby stopping the counter 33 from continuously cycling when there is no data signal E being received. The bit count 95 for signal K was selected to be well beyond that which would be reached during normal reception of incoming data signal E.

As long as the circuit is not in synchronization, incoming data signal E will continue to reset the counter 33. After the final synchronization bit FSB of each burst is received, the counter 33 will commence to count up. At bit count 85, control signal H, sets D flip-flop 40 on the trailing edge of the recovered clock signal 30. This is achieved by coupling the clock signal 30 through an inverter 41. The output signal from the flip-flop 40 sets the flip-flop 16 via the OR gate 17 which in turn opens the window as shown in waveforms D2 or D3. This occurs approximately one-half cycle before the anticipated arrival of the received data signal E.

A test is made at bit count 86 as shown in waveform F, for coincidence between the initial synchronization bit ISB of incoming data signal E and the bit control signal J utilizing AND gate 42. Coincidence between these two signals ISB and J produces an output from gate 42 which during an out-of-sync state, is coupled through AND gate 43 and OR gate 44 to increment an up/down counter 45. The counter 45 operates between a minimum of 0 and a maximum of 5. When it is clocked at bit count 86 the counter 45 is incremented whenever there is an output from OR gate 44 until it reaches a maximum of 5. If there is no output from OR gate 44 at this time, the counter 45 is decremented until it reaches a count of 0. Once the counter 45 reaches a count of 5, it sets a flip-flop 46 the Q output of which then goes high indicating an in-sync condition. Thereafter, AND gate 47 is enabled whenever the output of the decoder 35 reaches a count of 159. This in turn resets the flip-flop 16 which disables the receive-enable signal D so that it is now substantially coextensive with received data signal E as shown in waveform D3. Concurrently, the in-sync signal is coupled through the OR gate 36 so as to continuously enable the AND gate 32 as long as the receiver remains in synchronization.

The in-sync signal also enables an AND gate 48 which increments the counter 45 whenever there is coincidence between the final synchronization bit and bit count 159 of one frame and the initial synchronization bit and bit count 86 of the succeeding frame. Since both tests cannot be performed concurrently, the check for coincidence between the final synchronization bit FSB and control signal G at bit count 159 is performed in an AND gate 49, and the result stored in R-S flip-flop 50. The output of the flip-flop 50 is connected to one input of AND gate 48. If there is a positive output from AND gate 42 at bit count 86 of the succeeding cycle, all inputs to AND gate 48 are enabled and the up/down counter 45 is incremented during bit count signal 86. At the same time, the flip-flop 50 is reset by the bit count signal 86 to ready it for the next test for coincidence of the bit FSB at bit count 159.

Should coincidence of both the final and initial synchronization bits not occur, no output will result from AND gate 48 thereby resulting in the up/down counter 45 being decremented by 1 count. If this occurs more than five times, the counter will reach a count of 0 thereby resetting the flip-flop 46 which causes the receiver to go into an out-of-sync condition. As a result, the occasional loss of a few synchronization bits does not cause the receiver to lose synchronization. However the continued absence of either or both the final and initial synchronization bits will eventually cause the receiver to go into an out-of-sync condition and the circuit will be forced to reestablish synchronization.

In summary, during an out-of-sync condition a coincidence check is made for only the initial synchronization bit while during an in-sync condition a coincidence check is made for both the final and initial synchronization bits of two consecutive frames. Both checks cannot be made during an out-of-sync condition since incoming data continually resets the counter 33 which does not allow it to reach the final synchronization bit time at bit count 159.

In the slave mode, the switch 10 is connected to ground thereby disabling the AND gate 13, and continuously enabling the AND gate 24 whenever the receiver is out of synchronization. Unlike that at the master station, the receive-enable signal D continuously enables the AND gate 20 at the slave station during an out-of-sync state so that all incoming data signals are coupled therethrough. However once synchronization has been established the circuit at the slave station functions in a similar manner to that at the master station.

What is claimed is:

1. A digital transmission system having a master station and a slave station each including transmitting and receiving means for alternately transmitting and receiving bursts of digital signals of fixed length at fixed frame intervals over a single transmission path, each burst including initial and final synchronization bits at the beginning and ending respectively of each burst; and means for establishing frame synchronization, characterized by:

in the receiving means at the master station, gating means responsive to the absence of frame synchronization for passing bits of the received signal immediately preceding the transmission of each burst to the means for establishing frame synchronization, the bits of the received signal including the final synchronization bit and excluding at least the initial synchronization bit; the gating means also being responsive to the presence of frame synchronization for passing only signals received during a window period which is substantially coextensive with that of said bursts, to the means for establishing frame synchronization; and control means responsive to the final synchronization bit of one burst for initiating said window period substantially concurrent with the anticipated reception of the initial bit of the succeeding burst.

2. A digital transmission system as defined in claim 1 further characterized by:

means responsive to the final synchronization bit of one burst for generating initial and final comparison signal bits concurrent with the anticipated reception of the initial and final synchronization bits of the succeeding burst;

in the absence of frame synchronization, gating means responsive to the concurrent presence of the initial comparison and synchronization bits for establishing frame synchronization; and in the presence of frame synchronization, further gating means responsive to the concurrent presence of the final comparison and synchronization bits of one frame, and the concurrent presence of the initial comparison and synchronization bits of the succeeding frame for maintaining frame synchronization.

3. A digital transmission system as defined in claim 1 further characterized by:

means responsive to the presence of frame synchronization for terminating said window period substantially immediately after the reception of the final synchronization bit of each burst.

* * * * *